United States Patent [19]

Maeda

[11] 4,451,078

[45] May 29, 1984

[54] VEHICLE SEAT ASSEMBLY HAVING A DOOR STOPPER

[75] Inventor: Kouzo Maeda, Yokohama, Japan

[73] Assignee: Nissan Motor Co., Ltd., Yokohama, Japan

[21] Appl. No.: 290,073

[22] Filed: Aug. 4, 1981

[30] Foreign Application Priority Data

Aug. 14, 1980 [JP] Japan .......................... 55-115601[U]

[51] Int. Cl.³ .......................... B60J 5/04; B60R 21/02
[52] U.S. Cl. .................................. 296/188; 248/429; 296/65 A
[58] Field of Search .............. 296/146, 180, 202, 65 A; 248/429, 430

[56] References Cited

U.S. PATENT DOCUMENTS

| | | | |
|---|---|---|---|
| 3,491,979 | 1/1970 | Wonell | 248/430 |
| 3,819,228 | 6/1974 | Cornacchia | 296/146 |
| 3,883,171 | 5/1975 | Bauer | 296/188 |
| 3,887,227 | 6/1975 | Deckert | 296/146 |
| 3,944,278 | 3/1976 | Takahashi | 296/146 |
| 4,307,911 | 12/1981 | Pavlik | 296/146 |

FOREIGN PATENT DOCUMENTS

| | | |
|---|---|---|
| 2816318 | 10/1978 | Fed. Rep. of Germany ... 296/65 A |
| 2212246 | 7/1974 | France . |
| 2387143 | 4/1977 | France . |
| 2424146 | 11/1979 | France . |

*Primary Examiner*—Douglas C. Butler
*Assistant Examiner*—John A. Carroll
*Attorney, Agent, or Firm*—Schwartz, Jeffery, Schwaab Mack, Blumenthal & Koch

[57] ABSTRACT

A rigid member is secured to a frame of a seat proper. The rigid member has an extreme end located adjacent the vehicle door in close position so that when the door is urged to get into the vehicle collision upon a vehicle collision, the door getting-in motion is blocked by the extreme end of the rigid member.

16 Claims, 7 Drawing Figures

VEHICLE SEAT ASSEMBLY HAVING A DOOR STOPPER

BACKGROUND OF THE INVENTION

1. Field of the Invention

The present invention relates in general to a seat, and particularly to a vehicle seat assembly having safety means for protecting a passenger on the seat from injury upon a vehicle collision. More particularly, the present invention is concerned with a vehicle seat assembly having a door stopper which prevents a side door from getting into the passenger compartment upon a side vehicle collision.

2. Description of the Prior Art

When a passenger vehicle is subjected to a side vehicle collision causing breakage of a side door thereof, the door thus deformed is urged into the passenger compartment, so that it may happen that the passenger on the seat is sandwiched between the door and any member, such as a console box, mounted in the compartment, and thus he or she is injured. In order to solve this problem, various kinds of door stoppers have been proposed. However, some of them lack safety reliability and are uneconomical.

SUMMARY OF THE INVENTION

It is therefore an essential object of the present invention to provide a seat assembly having a door stopper which is both reliability safe and economical.

It is an object of the present invention to provide a vehicle seat assembly which is mounted in a vehicle having a door adjacent the seat assembly, the assembly comprising a sliding mechanism mounted on a floor of the vehicle for permitting a sliding movement of the seat assembly in a fore-and-aft direction relative to the floor, and a rigid member secured to the seat assembly to be movable therewith, the rigid member extending outwardly toward the door in closing position and terminating at its extreme end with a predetermined small space between the door and the extreme end, whereby when the door is pushed into the vehicle passenger compartment by an external force, the door is brought into contacting engagement with the extreme end of the rigid member thereby being prevented from moving further into the passenger compartment.

BRIEF SUMMARY OF THE DRAWINGS

Other objects and advantages of the present invention will become clear from the following description when taken in conjunction with the accompanying drawings, in which.

DETAILED DESCRIPTION OF THE INVENTION

Figure 1:
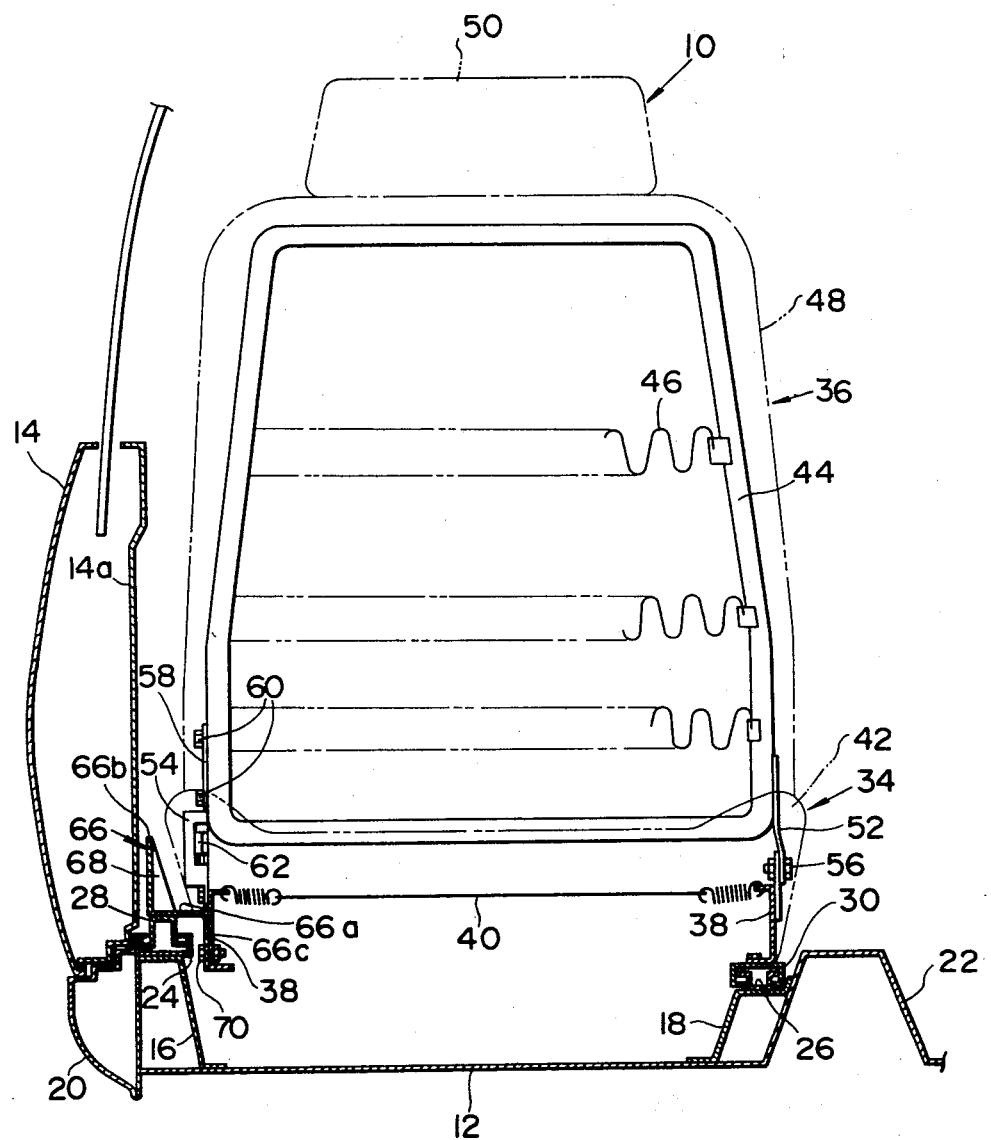
FIG. 1 is a front view of a vehicle seat assembly of a first embodiment of the present invention.
Figure 2:
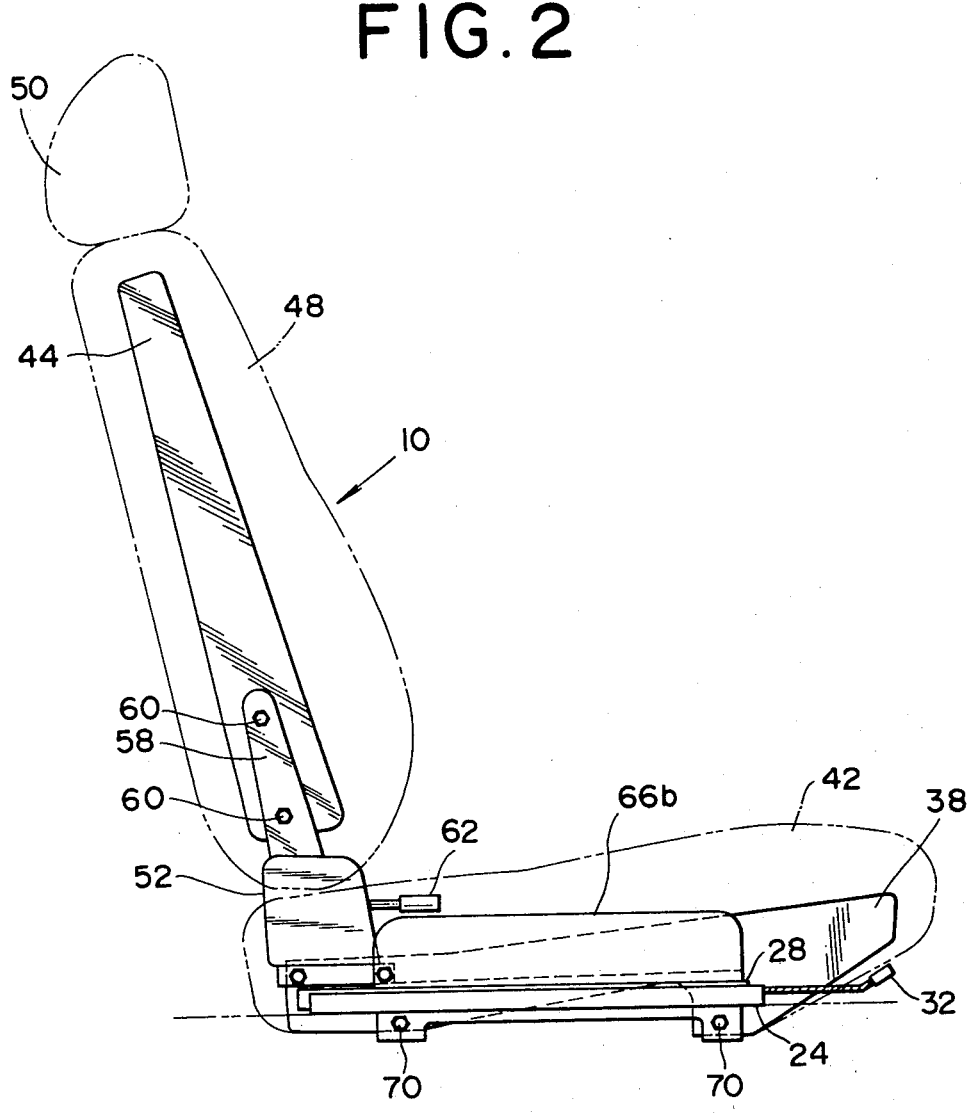
FIG. 2 is a side view of the seat assembly of the first embodiment.
Figure 3:
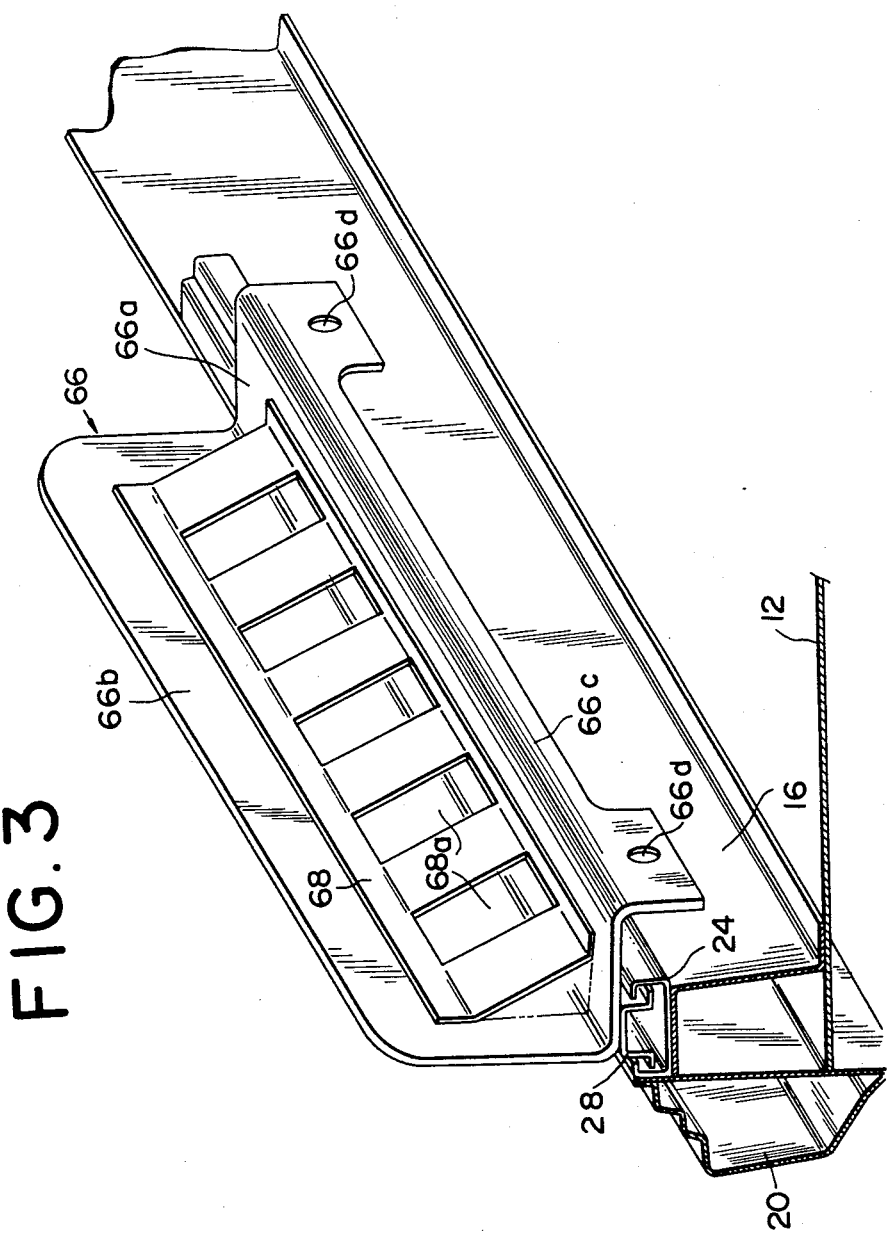
FIG. 3 is an enlarged perspective view of an essential section of the seat assembly of the first embodiment.
Figure 4:
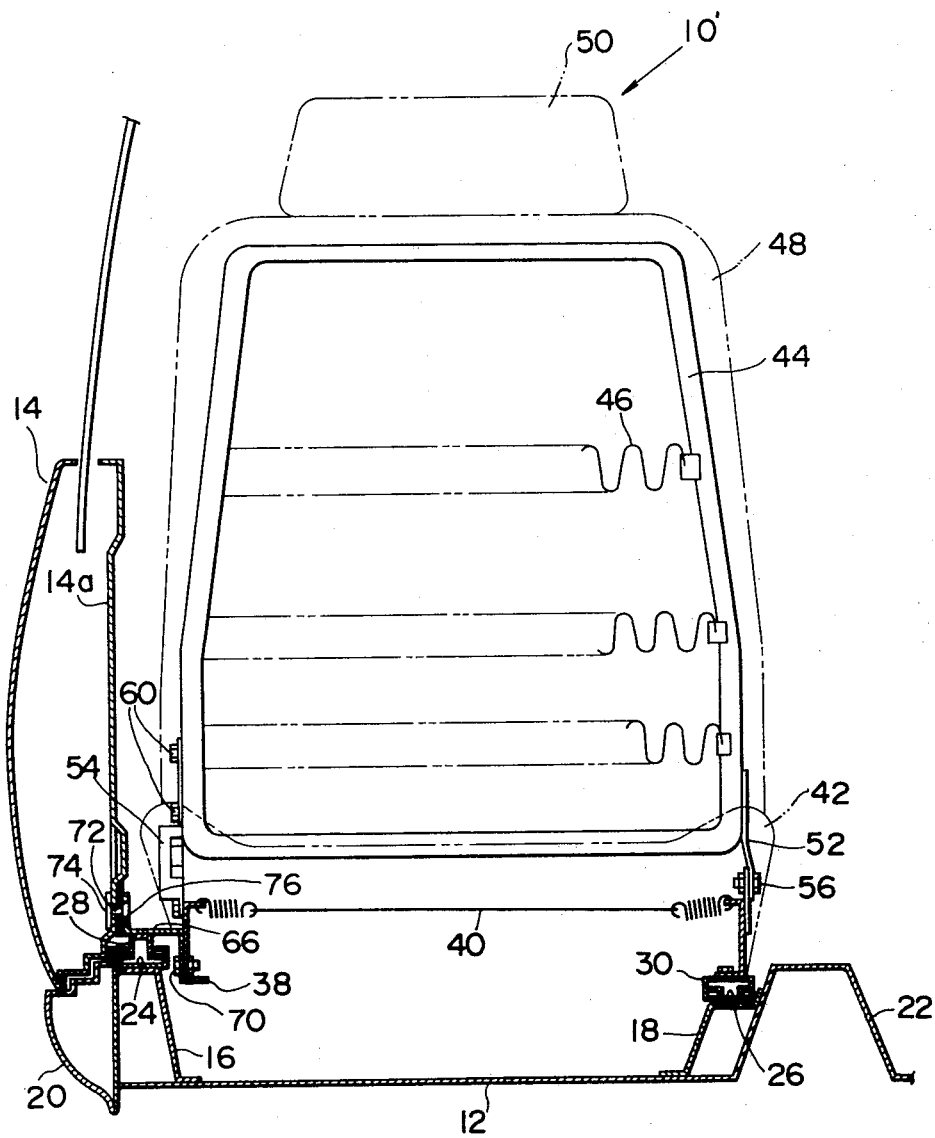
FIG. 4 is a front view of a vehicle seat assembly of a second embodiment of the present invention.

Referring to FIGS. 1 to 3, particularly FIG. 1, there is shown a vehicle seat assembly 10 of a first embodiment of the invention, which is mounted in a vehicle body having a floor panel 12 and a side door 14.

The seat assembly 10 is mounted on the floor panel 12 through a sliding mechanism which permits a sliding movement of the seat assembly 10 in a fore-and-aft direction relative to the floor panel 12. Two spaced elongate brackets 16 and 18, for mounting thereon the sliding mechanism, are securely mounted on the floor panel 12 to extend in a direction parallel with the longitudinal axis of the vehicle. One bracket 16 is located adjacent a side sill 20 and the other bracket 18 is located adjacent a transmission tunnel 22, as shown by FIG. 1. The sliding mechanism comprises a pair of lower rails 24 and 26 securely mounted on the brackets 16 and 18 respectively, and a pair of upper rails 28 and 30 longitudinally slidably disposed on the lower rails 24 and 26, respectively. Although not shown in the drawing, a known locking device is arranged in the sliding mechanism to lock the upper rails 28 and 30 at a desired position relative to the lower rails 24 and 26. In FIG. 2, an operation lever 32 of the locking device is shown. The door 14 which may be of swing type or slide type is shown comprising an outer panel, an inner panel 14a and a glass.

The seat assembly 10 generally comprises a seat proper 34 and a seatback 36 which is tiltable relative to the seat proper 34. The seat proper 34 comprises a rectangular frame 38 securely mounted on the upper rails 28 and 30 of the sliding mechanism. As will become clear as the description proceeds, a characteristic measure is applied to the connection between the frame 38 and the upper rails 28 and 30. A plurality of wire springs 40 are spanned between opposed sections of the frame 38, and a cushion member 42 is mounted on the wire springs 40 to cover the frame 38. The seatback 36 comprises a rectangular frame 44, a plurality of wire springs 46 spanned parallelly between opposed sections of the frame 44, and a cushion member 48 mounted on the springs 46 to cover the frame 44. A head rest 50 is mounted on the top of the seatback 36. For achieving the pivotal movement of the seatback 36 relative to the seat proper 34, a hinge device 52 and a tilting device 54 are arranged between them. The hinge device 52 comprises a stationary arm (no numeral) secured to the frame 38 of the seat proper, a movable arm (no numeral) secured to the frame 44 of the seatback 36 and a bolt 56 pivotally connecting these arms. Although not well shown in the drawings, the tilting device 54 comprises a stationary arm secured to the seat proper frame 38 and a tiltable arm 58 fixed by bolts 60 to the seatback frame 44. A known locking device (not shown) is arranged in the tilting device 54 in order to lock the seatback 48 at a desired angular position relative to the seat proper 34. The operation lever of the tilting device 54 is designated by numeral 62.

According to the present invention, the following measure is applied to the seat assembly 10 mentioned above.

As is best seen from FIG. 1, the connection between the seat proper frame 38 and the left-positioned upper rail 28 (which is located adjacent the opening for the door 14) is made by a rigid door stopper 66 which extends along the rail 28. The door stopper 66 is constructed of a strong metal, such as a steel, and comprises, as is clearly shown by FIG. 3, a horizontal base section 66a welded to the upper rail 28, a first flat section 66b extending vertically upward from the outboard edge of the base section 66a, and a second flat section 66c extending vertically downward from the inboard edge of the base section 66a. The first flat section 66b is parallel with the major portion of the door inner panel 14a. The second flat section 66c is formed with two openings 66d through which two bolts 70 pass for secure connection between the door stopper 66 and the seat proper frame 38. As is best understood from FIG. 1, the base section 66a of the door stopper 66 has a width for providing an adequate distance or space between the first flat section 66b and the seat proper 34. The corners of the first flat section 66b are smoothly curved. A reinforcing member 68 is disposed between the base section 66a and the first flat section 66b in order to increase mechanical strength of them, and if desired, a plurality of openings 68a may be formed in the reinforcing member 68 for weight reduction, as shown. It is now to be noted that, as will be understood from FIG. 1, the first flat section 66b is located somewhat inboard of the door opening so that the door 14 does not collide against the first flat section 66b under normal closing operation of the door 14.

When the vehicle is subjected to a side vehicle collision, that is, when another vehicle collides against the door 14, the door 14 is deformed and thus pushed into the vehicle passenger compartment. However, the door motion is blocked safely by the first flat section 66b of the door stopper 66. It is to be noted that when the vehicle collision is violent to such a degree that the seat assembly 10 is dislocated inwardly by the impacted door 14 breaking the sliding mechanism, the dislocation of the seat assembly 10 is carried out keeping a safe distance between the door 14 and the seat assembly 10 by the function of the door stopper 66 moved with the seat assembly 10. Thus, the passenger on the seat assembly 10 is protected from injury.

Referring to FIGS. 4 to 7, there is shown a vehicle seat assembly 10' of a second embodiment of the present invention. Similar parts to those in the first embodiment are designated by the same numerals.

Figure 5:
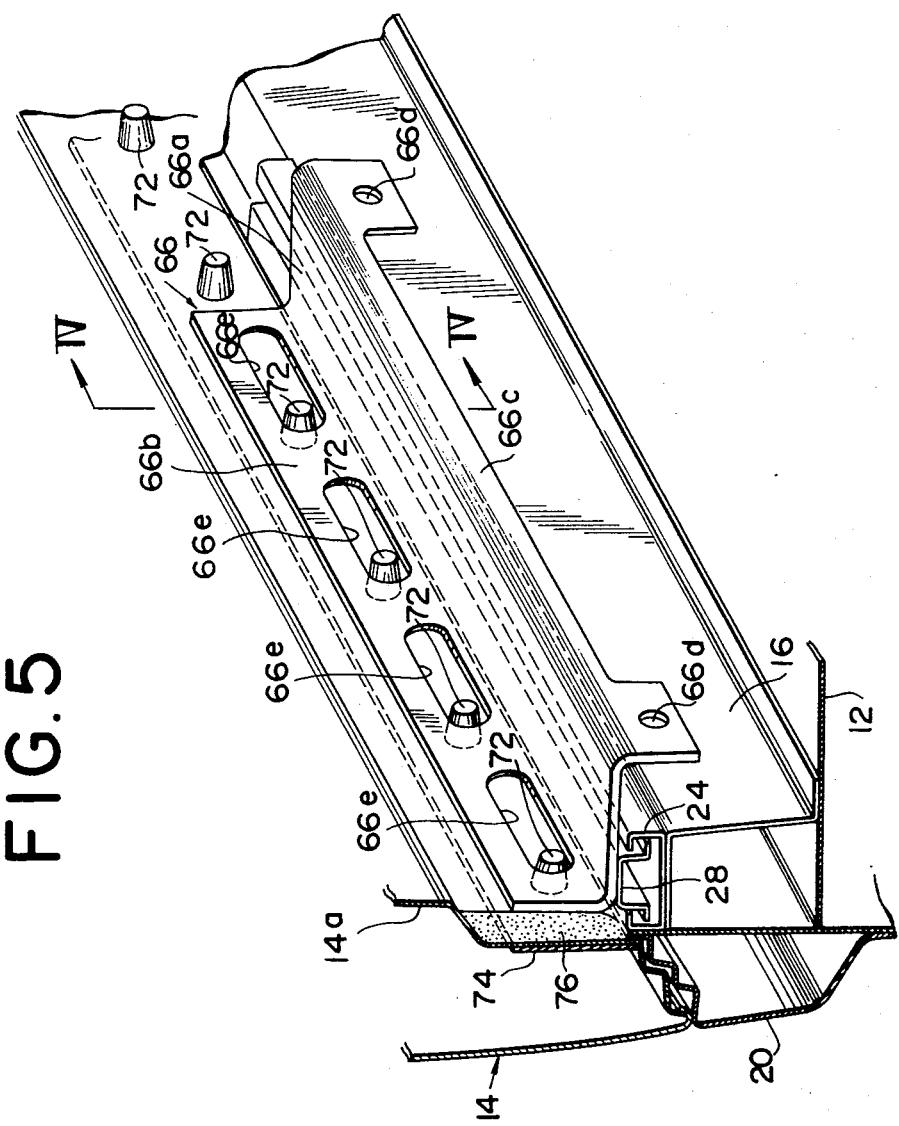
FIG. 5 is an enlarged perspective view of an essential section of the seat assembly of the second embodiment.
Figure 6:
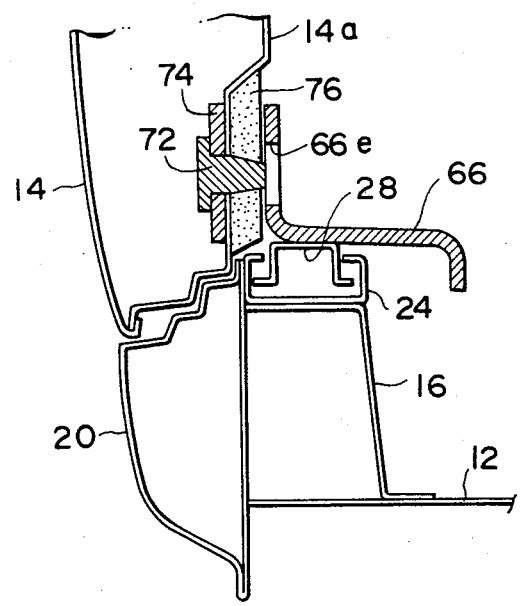
FIG. 6 is a sectional view taken along the line VI—VI of FIG. 5.
Figure 7:
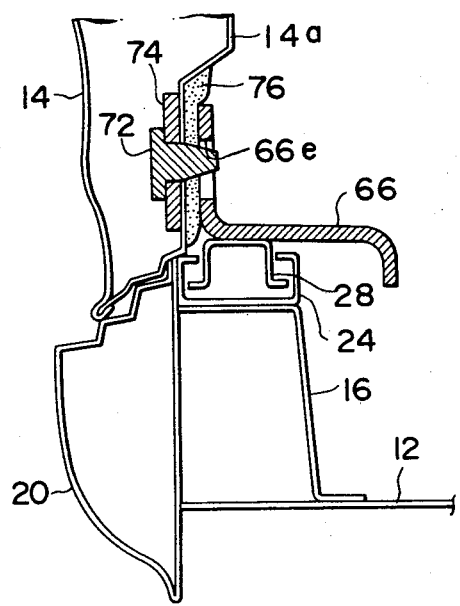
FIG. 7 is a view similar to FIG. 6, but showing a side door which is deformed.

As is well shown in FIG. 5, the door stopper 66 of the second embodiment has generally the same construction as that of the first embodiment except for the construction of the first flat section 66b. As shown, in the second embodiment, a plurality of equally spaced elongate openings 66e are formed in the first flat section 66b to extend along the longitudinal axis of the door stopper 66. A plurality of equally spaced conical projections are secured to the lower section of the inner panel 14a of the door 14 to extend outward of the door 14. The projections 72 are arranged to face the corresponding elongate openings 66e under normal closing of the door 14, and each of the elongate openings 66e is so sized as to receive therein the corresponding projection 72 irrespective of longitudinal displacement of the door stopper 66 induced by the operation of the sliding mechanism. (As will become apparent as the description proceeds, the projections 72 are inserted into the corresponding elongate openings 66e when the door 14 in closing position is violently pressed against the door stopper 66, for example, in a vehicle side collision.) For assuring one-to-one facing between the projections 72 and the openings 66e irrespective of the displacement of the door stopper 66, an arrangement may be employed in that the projections 72 are arrangement at the same pitch "l" as the locking pitch of the locking device of the sliding mechanism, and each of the elongate openings 66e has a longitudinal length greater than the effective diameter "d" of the corresponding projection 72, or another arrangement may be employed in that the projections 72 are aligned at the pitch of "2l", and each elongate opening 66e has a longitudinal length greater than "l+d". For assuring the secure connection between the projections 72 and the door inner panel 14a, a reinforcing plate 74 is attached to the inner surface of the inner panel 14a as is best shown by FIGS. 6 and 7. Onto the outer surface of the inner panel 14a is attached a pad member 76 of flexible material, such as a foamed rubber, which has a plurality of openings (no numeral) in which the projections 72 are placed. The pad member 76 has a thickness to almost cover the projections 72 or to allow the outer surface thereof to be flush with the leading flat ends of the projections 72 as will be seen from FIG. 6. The inner panel 14a may be recessed at the position where the pad member 76 is positioned so that the outer face of the pad member 76 is substantially flush with the major portion of the inner panel 14a, as shown. It is thus to be noted that in a normal condition, the forward and rearward movements of the seat assembly 10' carried out by the sliding mechanism are smoothly made without obstruction of the projections 72 even when the door 14 is closed.

When the vehicle encounters a side vehicle collision, the door is deformed and urged into the vehicle passenger compartment. However, the door motion is blocked by the first vertical section 66b of the door stopper 66. Furthermore, upon this motion, the projections 72 on the door 14 are brought into engagement with the openings 66e of the door stopper 66, pressing down the pad member 76, as is clearly shown by FIG. 7. Thus, the relative sliding movement between the door 14 thus deformed and the door stopper 66 is suppressed, so that the undesired door motion is inhibited much more effectively.

In conclusion, the following advantages are achieved according to the present invention.

1. Since the door stopper is connected to the seat to be movable therewith, the dislocation of the seat upon a vehicle collision is carried out keeping a safe distance between the door and the seat. This is quite advantageous in protecting the passenger on the seat, as has mentioned before.

2. Since the door stopper is movable with the seat, the ingress and egress of the passenger into and from the vehicle is not affected by the stopper.

3. If a measure for preventing relative sliding movement between the door and the door stopper is employed as in the case of the second embodiment, the passenger protecting function is even further improved.

What is claimed is:
1. A vehicle comprising:
a chassis having a passenger compartment with a floor and a door which can be moved between an open position and a closed position;
a seat assembly located near said door in said passenger compartment;
a sliding mechanism mounted on said floor of said vehicle and supporting said seat assembly for permitting sliding movement of said seat assembly in a fore-and-aft direction relative to said floor; and
a rigid member secured to said seat assembly to move therewith, said rigid member extending toward the door in said closed position, said rigid member having a leading end portion with a flat section which is substantially parallel with a portion of a surface of said closed door and which is positioned adjacent to said portion and spaced from said portion by a predetermined distance such that upon movement of said door inward of said passenger compartment beyond said closed position, said door contacts said flat section, said rigid member being attached between said seat assembly and said sliding mechanism for mounting said seat assembly on said sliding mechanism, whereby during a collision, when said door is pushed into said passenger compartment by an external force applied thereto, said door is brought into engagement with said flat section of said rigid member thereby either preventing further inward motion of said door or moving said seat assembly in response to movement of said door.

2. A vehicle as claimed in claim 1, in which said sliding mechanism includes an upper rail and said seat assembly includes a seat frame, wherein said rigid member has a horizontal base section secured to said upper rail and another flat section secured to said seat frame for mounting said seat assembly on said sliding mechanism.

3. A vehicle comprising:
a chassis having a passenger compartment with a floor and a door which can be moved between an open position and a closed position;
a seat assembly located near said door in said passenger compartment;
a sliding mechanism mounted on said floor of said vehicle and supporting said seat assembly for permitting sliding movement of said seat assembly in a fore-and-aft direction relative to said floor;
an L-shaped rigid member having an upright portion and a base portion, said rigid member being secured to said seat assembly to move therewith, said rigid member extending toward the door in said closed position, said rigid member upright portion having a leading end portion with a flat section which is substantially parallel with a portion of a surface of said closed door and which is positioned adjacent to said surface portion and spaced from said surface portion by a predetermined distance such that upon movement of said door inward of said passenger compartment beyond said closed position, said door contacts said flat section; and
a reinforcing member attached between said upright and base portions of said rigid member for reinforcing said leading end portion;
whereby during a collision, when said door is pushed into said passenger compartment by an external force applied thereto, said door is brought into engagement with said flat section of said rigid member thereby either preventing further inward motion of said door or moving said seat assembly in response to movement of said door.

4. A vehicle comprising:
a chassis having a passenger compartment with a floor and a door which can be moved between an open position and a closed position;
a seat assembly located near said door in said passenger compartment;
a sliding mechanism mounted on said floor of said vehicle and supporting said seat assembly for permitting sliding movement of said seat assembly in a fore-and-aft direction relative to said floor;
a rigid member secured to said seat assembly to move therewith, said rigid member extending toward the door in said closed position, said rigid member having a leading end portion with a flat section which is substantially parallel with a portion of a surface of said closed door and which is positioned adjacent to said portion and spaced from said portion by a predetermined distance such that upon movement of said door inward of said passenger compartment beyond said closed position, said door contacts said flat section; and
stopper means for preventing relative sliding movement between the flat section of said rigid member and said door upon engagement therebetween;
whereby during a collision, when said door is pushed into said passenger compartment by an external force applied thereto, said door is brought into engagement with said flat section of said rigid member thereby either preventing further inward motion of said door or moving said seat assembly in response to movement of said door.

5. A vehicle as claimed in claim 4, wherein said door comprises an inner panel, and said stopper means comprises a plurality of projections secured to said inner panel of said door, said projections extending toward said flat section when said door is in said closed position, and a plurality of openings formed in said flat section for respectively receiving therein said projections upon engagement between said flat section and said door.

6. A vehicle as claimed in claim 5, in which said inner panel has an outer surface facing said passenger compartment, and said stopper means further comprises a pad member which is mounted on said outer surface of said inner panel of said door in a manner to almost cover said projections.

7. A vehicle as claimed in claim 6, in which said inner panel has an inner surface, and said stopper means further comprises a reinforcing plate which is attached to said inner surface of said panel to assure a reliable connection between the projections and said inner panel.

8. A vehicle as claimed in claim 6, in which said projections on said door inner panel are equally spaced from one another, and said openings in the flat section of said rigid member are equally spaced from one another by a distance equal to that of said projections.

9. A vehicle as claimed in claim 8, in which said openings of said rigid member are each elongated.

10. A vehicle comprising:
a chassis having a passenger compartment with a floor, and a door which can be moved between an open position and a closed position;
a seat assembly located near said door in said passenger compartment;
a sliding mechanism mounted on said floor of said vehicle for supporting said seat assembly for permitting a sliding movement of said seat assembly in a fore-and-aft direction relative to said floor;
a rigid member securely connected to said seat assembly to move therewith, said rigid member extending toward the door in closed position and terminating in an extreme end portion with a certain clearance between the closed door and said extreme end portion, said extreme end portion having at least one opening facing toward the closed door;

a plurality of projections secured to the inboard side of said door in such a manner that one of said projections and said opening of said rigid member face each other when said door is in its closed position; and a flexible pad member fixed to the inboard side of said door to substantially cover said projections, whereby when said door is forced into the vehicle passenger compartment by an external force applied thereto, said inboard side of said door is brought into engagement with said extreme end portion of said rigid member moving the projection of the door into said opening of said rigid member.

11. A vehicle as claimed in claim 10, in which said extreme end portion of said rigid member is formed with a plurality of openings which are equally spaced from one another, and in which said projections of said door are equally spaced from one another by a distance equal to that of said openings.

12. A vehicle as claimed in claim 11, in which each of said openings is elongated.

13. A vehicle as claimed in claim 12, in which said flexible pad member is formed with a plurality of openings in which said projections are respectively placed.

14. A vehicle as claimed in claim 13, in which said pad member has a thickness to almost cover said projections to allow the outer surface thereof to be flush with leading ends of said projections.

15. A vehicle as claimed in claim 14, in which said pad member is received in a recess formed in the inboard side of said door so that the outer face of said pad member is substantially flush with the major surface portion of said inboard side of said door.

16. A vehicle as claimed in claim 15, in which a reinforcing plate is attached to said inboard side of said door to assure connection between said projections and said door inboard side.

* * * * *